No. 886,618. PATENTED MAY 5, 1908.
J. H. LUBBERS.
APPARATUS FOR DRAWING HOLLOW GLASS ARTICLES.
APPLICATION FILED MAY 21, 1903. RENEWED APR. 25, 1906.
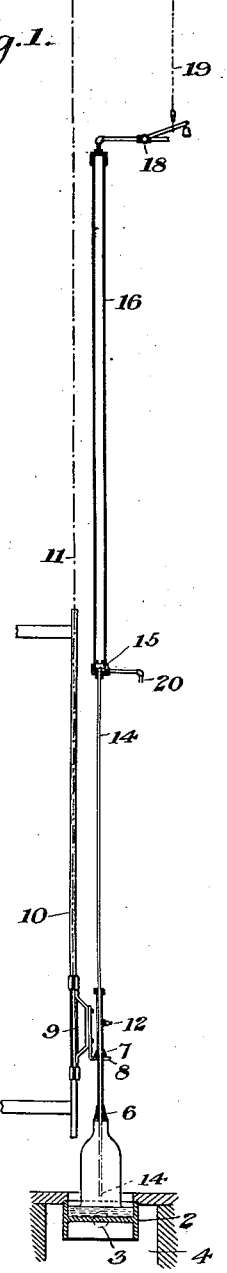
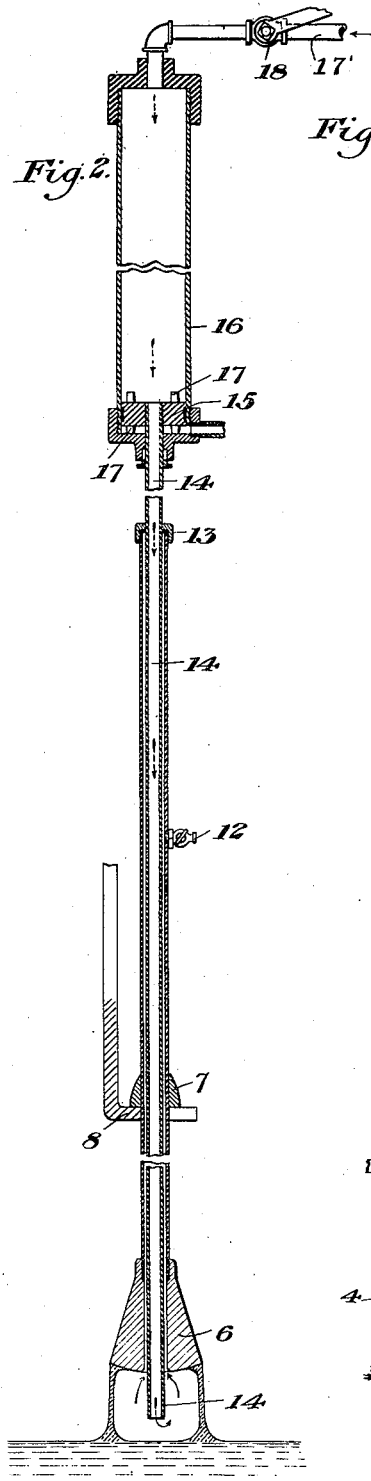
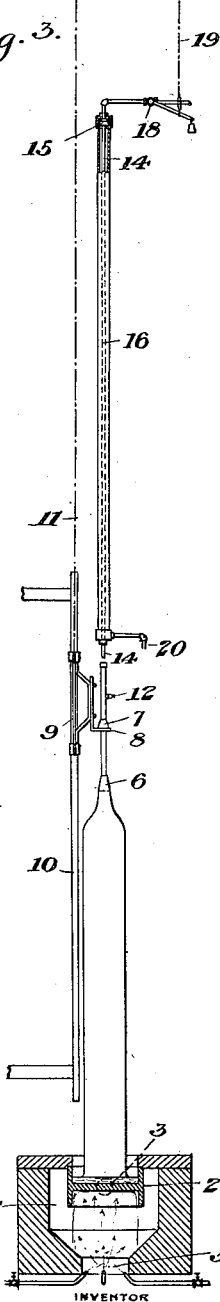
WITNESSES
INVENTOR

UNITED STATES PATENT OFFICE.

JOHN H. LUBBERS, OF ALLEGHENY, PENNSYLVANIA, ASSIGNOR TO WINDOW GLASS MACHINE COMPANY, OF PITTSBURG, PENNSYLVANIA, A CORPORATION OF NEW JERSEY.

APPARATUS FOR DRAWING HOLLOW GLASS ARTICLES.

No. 886,618.  Specification of Letters Patent.  Patented May 5, 1908.

Application filed May 21, 1903, Serial No. 158,069. Renewed April 25, 1906. Serial No. 313,681.

*To all whom it may concern:*

Be it known that I, JOHN H. LUBBERS, a citizen of the United States, residing at Allegheny, Allegheny county, Pennsylvania, have invented certain new and useful Apparatus for Drawing Hollow Glass Articles, of which the following is a full, clear, and exact description, reference being had to the accompanying drawings, forming part of this specification, in which—

Figure 1 is a vertical section showing the drawing of a glass cylinder in accordance with my invention; Fig. 2 is an enlarged vertical section of the apparatus during the first portion of the drawing operation, and Fig. 3 is a view similar to Fig. 1, showing the withdrawal of the air supply pipe after the cylinder has been drawn to the desired length.

My invention relates to the drawing of hollow glass articles and is designed to provide for chilling the interior of the hollow article at or near the drawing point, thereby enabling articles of thicker glass to be drawn than where outside chilling is used, and also equalizing the heat of the molten bath of glass which is more liable to chill in its outer portions. The inside chilling also enables the glass to be drawn at greater speed than formerly, and is of especial advantage where heat is applied to the bottom of the pot.

The invention is designed to chill the glass by air or gaseous fluid which is introduced through the bait, the air being supplied at the same level, or substantially the same level with respect to that of the glass bath, throughout the drawing operations. By thus applying the air its effect in chilling is substantially uniform throughout the drawing, and the chilling effect is much stronger than where the air is introduced through a central hole in the pot.

The invention is further designed to provide for withdrawing the hollow article and the supply tube from each other after the drawing operation is completed, this being preferably accomplished by drawing the supply tube upwardly out of the article after the drawing of the glass article is completed.

The invention also relates to the exhaust or relief of a small portion of the air supplied to the interior of the article during drawing, through a small hole which is opened by the operator after the forming of the cap; so that a constant opening is provided through which the excess air is passed out as it becomes heated within the article. This has been found desirable, especially in connection with a graduating valve by which the supply of the air is controlled, since the small outlet prevents the enlarging of the article during drawing, which is otherwise liable to occur on account of variations of pressure in the cylinder.

In the drawings, 2 represents a double reversible pot into which the glass may be ladled or otherwise supplied, this pot being supported upon trunnions 3, within the upper portion of a furnace 4, to which heat is supplied through an eye 5. The pot is arranged to be raised and lowered and to be turned over so that after the drawing operation it may be reversed and the heat used to melt out the refuse glass. The pot may be either of double form with holding cavities in top and bottom, as shown, or of single form. This arrangement of pot and furnace is not claimed by me it being the invention of Lincoln Thornburg.

I have shown the bait or drawing tool 6 as consisting of a blow-pipe of ordinary form, having a collar 7 which is hung on a hook 8 supported on the drawing-frame 9. The drawing frame is guided between vertical supports 10, 10, being lifted by a wire rope 11, or by other suitable mechanism. At an intermediate point of the blow pipe is provided a pet cock 12 by which a small amount of the air may be allowed to pass out during the drawing and after the cap is formed. This pet cock is turned to open or partly open the hole, after the cap has been formed, it remaining open throughout the blowing operation. The blow pipe is provided with a stuffing box 13 in its top through which extends the air supply-pipe 14, the lower end terminating near the level of the molten bath of glass in the pot. The upper end of this supply tube extends through and is secured to a piston 15 movable within a long cylinder or tube 16, supported in any suitable way, the piston having projections 17 on each face which prevent it from reaching the heads of the cylinder or tube. The stationary air-supply pipe 17' enters through the top head of the cylinder 16, this tube being provided with the usual graduating valve 18 having a connection 19 by which it is slowly turned during the drawing operation, as described in my previous patents, 702,013 and 702,014 granted on June 10th, 1902. A high pressure air supply tube 20 enters the lower end of the cylinder 16, this tube being provided with a suitable hand controlled valve by which the operator may supply high pressure air to or exhaust it from the cylinder beneath the piston.

In carrying out the drawing operation the parts are in the position shown in Fig. 2, the operator supplying sufficient air through a hand valve at the working pulpit, and controlling the pipe 17' to form the neck and then swell out the article to form the cap of the desired size of the cylinder or article to be drawn. The pet cock on the blow pipe is then opened, and the drawing of the article begins; and as the article is drawn upwardly, air flows down through the upper cylinder and the supply pipe and emerges near the level of the molten glass and at the same level throughout the drawing operation. The supply of air during the drawing is regulated by the graduating valve to hold the article at the same size as it is being drawn, the regulation being assisted by allowing any excess air, which is expanded by the heat of the glass, to pass out through the small pet cock, thus preventing an enlarging of the cylinder. The small air outlet acts in the manner of an automatic regulator to equalize the pressure in the article being drawn and keep it substantially uniform. Expansion and contraction of the air is liable to take place during the drawing operation and the outflow of air through this hole will vary according to the varying conditions, in such a way as to maintain a substantially constant pressure in the cylinder. This pressure is preferably very small; and owing to changes in the temperature and humidity of the air it is found necessary to use some regulating device. Otherwise, the cylinder will be enlarged and contracted and will be difficult to flatten into commercial glass. After the article is drawn to the desired length, high pressure air is admitted under the piston, and the supply-tube is thereby forced up and withdrawn from the article and the blow-pipe, the parts taking the position shown in Fig. 3. The blow-pipe is then lifted off the frame and lowered with the article to one side of the furnace.

The advantages of my invention result from supplying air through the hollow drawing tool, and at substantially the same level throughout the drawing operation. This tends to cool the central part of the molten bath, and renders the glass of more uniform consistency throughout the bath. It also produces a stronger chilling effect at or near the drawing point, enabling the drawing to be carried out more rapidly, or enabling a thicker article to be drawn if desired. Another advantage of this method of supplying the air is that the cold air supplied near the level of the bath tends to force the heated air inside the article toward its upper portions, thus tending to anneal them and prevent rapid cooling of the upper parts which would give hard glass. This is of special advantage in drawing long cylinders, where the upper parts of the cylinder are lifted to a level far above the bath. The use of the cylinder and piston enables the supply tube to be quickly and easily withdrawn from the tool and the article, while the apparatus is simple and not expensive. The use of the hand-controlled outlet between the graduating valve and the article is of advantage, as it provides a constant small outlet which is under the control of the operator, who can judge as to the proper area of outlet to give the desired result. After he has turned this outlet valve to open it to the desired extent, the air is then under the control of the graduating valve, which automatically varies the air supply as the drawing proceeds.

Many changes may be made in the form and arrangement of the drawing apparatus, the depending supply tube, the means for withdrawing the tube and article from each other, the hand controlled outlet, etc., without departing from my invention.

I claim:—

1. Apparatus for drawing hollow glass articles, comprising a hollow drawing tool arranged to draw the glass upwardly from a bath, connections arranged to supply air to the interior of the article during drawing, and a normally freely open hand controlled air outlet arranged to allow a small amount of air to pass out during the drawing of the article; substantially as described.

2. In a glass drawing apparatus, a hollow drawing tool, and a depending air supply pipe over which the tool is drawn during the drawing operation; substantially as described.

3. In a drawing apparatus for glass, a hollow drawing tool, an air supply tube over which the tool is drawn, and means for withdrawing the supply tube from the hollow article after the drawing operation is completed; substantially as described.

4. In glass drawing apparatus, a hollow drawing tool, an air supply connection leading thereto and provided with an automatic graduating valve, and a hand controlled outlet between the graduating valve and the article being drawn; substantially as described.

5. In glass drawing apparatus, a drawing tool, an air supply cylinder, and a depending air supply pipe having telescopic connection with the air supply cylinder; substantially as described.

6. In glass drawing apparatus, a hollow drawing tool, a supply tube over which it moves, and an air supply cylinder or tube within which the supply tube is arranged to telescope; substantially as described.

7. In the art of manufacturing glass, a gatherer adapted to draw glass in cylindrical or other inclosed form, an opening therein and means for discharging a cooling fluid, through said opening and at substantially the lower exposed portion of said draw during the entire operation of drawing the glass; substantially as described.

8. In glass drawing apparatus a receptacle for molten glass, a drawing tool arranged to draw a hollow article upwardly therefrom and a depending air supply pipe around which the article is drawn upwardly; substantially as described.

9. In the art of manufacturing glass, a gatherer adapted to draw glass in a cylindrical or other inclosed form having an outlet and an inlet tube extending through said gatherer and movable longitudinally relative thereto; substantially as described.

10. In the art of manufacturing glass, a gatherer adapted to draw glass in cylindrical or other inclosed form, an opening therein and means for discharging a cooling fluid through said opening at substantially the lower exposed portion of said draw during substantially the entire operation of drawing the glass and secondary means for withdrawing said first means from the gatherer; substantially as described.

11. In the art of manufacturing glass, a gatherer adapted to draw glass in cylindrical or other inclosed form, an opening therein, means for discharging a cooling fluid through said opening at substantially the lower exposed portion of said draw during substantially the entire operation of drawing the glass and secondary means for lowering the lower extremity of said first means into said gatherer; substantially as described.

12. In the art of manufacturing glass, a gatherer adapted to draw glass in cylindrical or other inclosed form, an opening therein, means for discharging a cooling fluid through said opening at substantially the lower exposed portion of said draw during substantially the entire operation of drawing the glass and secondary means for lowering and withdrawing the lower extremity of said first means into and from said gatherer; substantially as described.

13. In the art of manufacturing glass, a gatherer adapted to draw glass in cylindrical or other inclosed form having an outlet and a downwardly extensible tube in said gatherer and means for withdrawing said tube from said gatherer; substantially as described.

14. In the art of manufacturing glass, a gatherer adapted to draw glass in cylindrical or other inclosed form having an opening therein, a tube extensible through said opening and means for reciprocating a portion of said tube in said gatherer; substantially as described.

15. In the art of manufacturing glass, a gatherer adapted to draw glass in cylindrical or other inclosed form having an opening therein, a tube supported from without said gatherer and extending thereinto said gatherer being arranged to travel upwardly while said tube remains stationary whereby a flow of fluid is discharged in the body of said draw below the bottom of said gatherer during the operation of drawing glass; substantially as described.

16. In the art of manufacturing glass, a gatherer, a downwardly extensible tube in said gatherer and means for withdrawing said tube therefrom; substantially as described.

17. In the art of manufacturing glass, a gatherer and an inlet tube extending through said gatherer and movable longitudinally relative thereto; substantially as described.

18. In the art of manufacturing glass, a gatherer, an inlet tube arranged to extend into said gatherer and a piston adapted to move said inlet tube longitudinally relative to said gatherer; substantially as described.

19. In the art of manufacturing glass, a gatherer, an inlet tube arranged to extend into said gatherer, a piston adapted to move said inlet tube longitudinally relative to said gatherer, and stops arranged to limit the movement of said piston; substantially as described.

20. In glass drawing apparatus, an air supply pipe having an open outlet for air arranged to equalize pressure in the article being drawn, substantially as described.

21. A tool for drawing hollow glass articles comprising a pipe and connected bait, having an air inlet, and provided with a separate open escape vent for variations or excess pressure in the article and pipe, substantially as described.

22. A tool for drawing hollow glass articles having an air inlet opening to the article, and a freely open outlet to allow escape of excess air and equalize variations of pressure in the article, substantially as described.

23. Apparatus for drawing hollow glass articles having an air inlet and a constantly regulating vent, both in communication with the article being drawn, substantially as described.

24. In apparatus for drawing hollow glass articles, a connection supplying fluid under pressure to the article, having a regulating vent automatically equalizing variations of pressure within the article, substantially as described.

25. A blow pipe for drawing glass articles having a constantly open outlet to the atmosphere between the fluid supply and the article, substantially as described.

In testimony whereof, I have hereunto set my hand.

JOHN H. LUBBERS.

Witnesses:
GEO. B. BLEMING,
JOHN MILLER.